(No Model.)
O. B. SHALLENBERGER.
METER FOR ALTERNATING ELECTRIC CURRENTS.
No. 449,002. Patented Mar. 24, 1891.
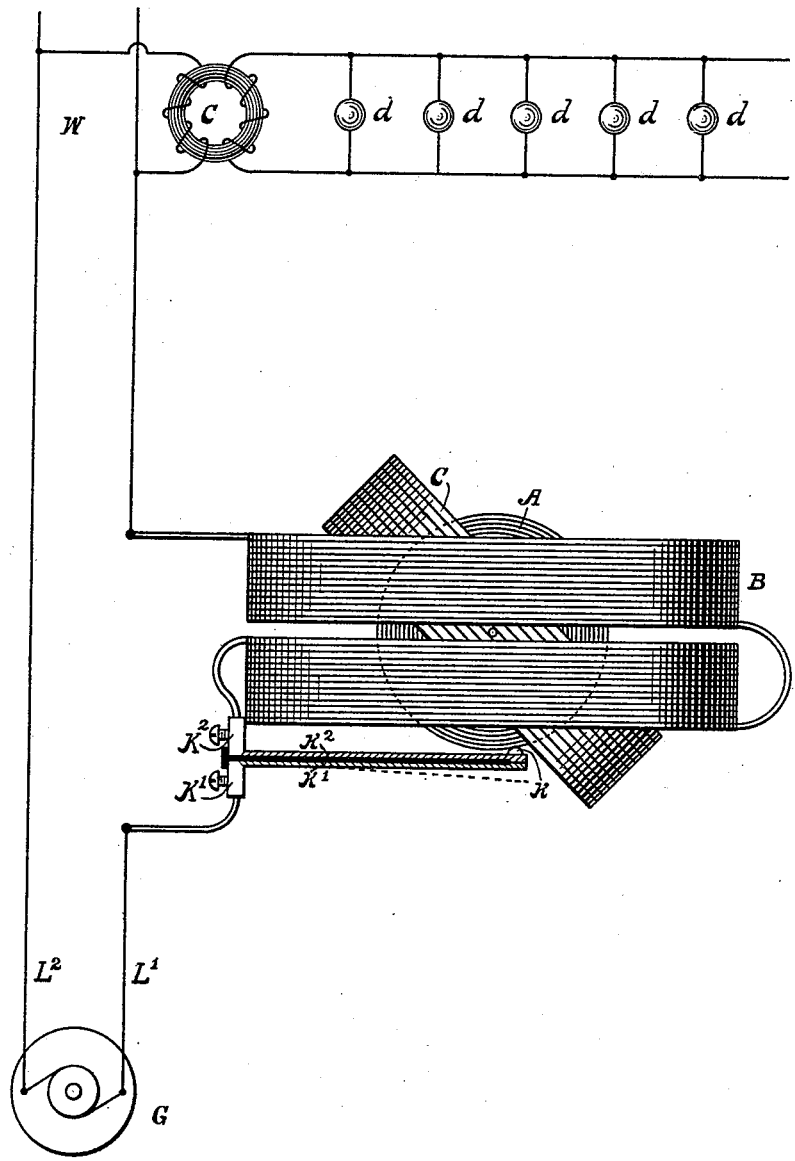

UNITED STATES PATENT OFFICE.

OLIVER B. SHALLENBERGER, OF ROCHESTER, ASSIGNOR, BY MESNE ASSIGNMENTS, TO THE WESTINGHOUSE ELECTRIC AND MANUFACTURING COMPANY, OF PITTSBURG, PENNSYLVANIA.

METER FOR ALTERNATING ELECTRIC CURRENTS.

SPECIFICATION forming part of Letters Patent No. 449,002, dated March 24, 1891.

Application filed March 3, 1890. Serial No. 342,526. (No model.)

*To all whom it may concern:*

Be it known that I, OLIVER B. SHALLENBERGER, a citizen of the United States, and a resident of Rochester, in the county of Beaver and State of Pennsylvania, have invented a certain new and useful Improvement in Meters for Alternating Electric Currents, (Case No. 393,) of which the following is a specification.

My invention relates to certain improvements in apparatus for measuring electric currents consumed in doing useful work upon alternating-current circuits.

The object of the invention is to provide means whereby a meter may be caused to register only the current consumed in doing useful work and not be operated by the leakage-current which may flow in the circuit when no work is being done, or by such currents as may be consumed in any other operation than doing useful work. Such a measuring-instrument is especially desirable in connection with the primary circuits employing electric converters or transformers for the reason that there is practically some slight leakage through the primary coils of the converters even when their secondary circuits are open, and therefore unless special means are employed to guard against it a meter placed in the primary circuit would record the flow of such currents and might be continually operated even though no useful work were being done. Again, the meter placed in any circuit may be subjected to a continual flow of current, owing to a more or less defective insulation or from some other cause.

My invention consists in so organizing a meter designed to be connected in an electric circuit that it will commence to operate only when the flow of current through the circuit to which it is applied exceeds the leakage of the circuit or of converters which may be connected in the circuit, and at the same time will give an accurate record of the current consumed in doing useful work.

In the accompanying drawing there is illustrated a device for carrying this invention into effect.

Referring to the drawing, G represents a suitable source of alternating, intermittent or pulsatory electric currents, and $L'$ $L^2$ main-line conductors leading therefrom. The work-circuit W is illustrated as having the primary coil of a converter C connected in it. The secondary coil in this instance supplies translating devices $d$, such as incandescent lamps, which may be cut in and out of circuit, as desired.

The meter illustrated is of the general character described in certain Letters Patent issued to me August 14, 1888, Nos. 388,003 and 388,004. The armature A of this meter is acted upon by the currents traversing the primary coil B and the induced currents established in a conductor C, placed at an angle to the coil B. A thermostatic device is employed for arresting the motion of the meter except when the current has attained a predetermined value. The thermostatic device consists of two strips of metal $k'$ $k^2$, having different rates of expansion under the influence of heat. The strips are insulated from each other throughout their length and secured, respectively, to the plates $K'$ $K^2$ at one end. The opposite ends are in electrical connection with each other. The two strips are connected in circuit in series, the conductor $L'$ being led to the block $K'$, while the block $K^2$ is connected with the coils B. When little or no current is passing through the thermostatic device, a brake or arresting device $k$, carried at the free end, rests against the armature and prevents it from revolving. As the current increases, however, and the leakage-current is exceeded, sufficient heat is developed by its passage through the thermostatic strips to cause them to bend away from the armature, as indicated by the dotted lines, thus releasing the armature and allowing the meter to operate.

The thermostatic device here shown is operated by the heat developed in itself by reason of the resistance which it offers to the flow of the current through the two strips.

I claim as my invention—

1. The combination, with a meter for electric currents, of a thermostatic brake, substantially as described.

2. The combination, with a meter for electric currents, of a thermostatic brake connected in circuit therewith and operated by currents traversing it to release the meter under influence of currents of a predetermined value.

3. The combination, with a meter having a primary inducing-coil, a secondary coil, and an armature acted upon by the resultant effects of the two coils, of a thermostatic brake therefor connected in circuit with one of the said coils and normally arresting the movements of the armature and releasing the armature under the influence of a current of given strength flowing therethrough.

4. The combination, with a meter having the coils or circuits B and C and armature A, of a thermostatic device normally arresting the armature and connected in circuit with the coil B and caused to bend under the influence of currents of a predetermined strength traversing its component strips and thereby release the armature, substantially as described.

5. The hereinbefore-described method of measuring electric currents by an electric meter, which consists in normally holding the meter at rest, developing heat by the currents flowing to the meter, and releasing the meter by the heat developed by currents of predetermined value.

In testimony whereof I have hereunto subscribed my name this 28th day of February, A. D. 1890.

OLIVER B. SHALLENBERGER.

Witnesses:
S. R. ROSEMAND,
J. W. SMITH.